United States Patent [19]

Rombola et al.

[11] Patent Number: 4,922,350
[45] Date of Patent: May 1, 1990

[54] DOCUMENT RECOGNITION WITH FORWARD DIRECTION SCAN FOR DETECTING THE BOUNDARIES OF AN ORIGINAL DOCUMENT AND REVERSE DIRECTION SCAN FOR PRODUCING RECORDED IMAGE ON THE ORIGINAL DOCUMENT

[75] Inventors: Gregory Rombola, Churchville; Frank L. Muster, Fairport; Lawrence B. Telle, Rochester, all of N.Y.

[73] Assignee: Eastman Kodak Company, Rochester, N.Y.

[21] Appl. No.: 175,065

[22] Filed: Mar. 30, 1988

[51] Int. Cl.⁵ .......................... H04N 1/12; H04N 1/17
[52] U.S. Cl. .................................... 358/488; 358/449; 358/486; 358/465
[58] Field of Search ............... 358/287, 282, 293, 285, 358/449, 451, 472, 474, 465, 494, 464, 488, 486

[56] References Cited

U.S. PATENT DOCUMENTS

| | | | |
|---|---|---|---|
| 3,436,474 | 4/1969 | Saeger et al. | 358/486 |
| 4,247,872 | 1/1981 | Wada et al. | 358/285 |
| 4,296,441 | 10/1981 | Ogasawara | 358/285 |
| 4,325,086 | 4/1982 | Sato et al. | 358/488 |
| 4,439,790 | 3/1984 | Yoshida | 358/449 |
| 4,449,152 | 5/1984 | Kurata et al. | 358/486 |
| 4,554,592 | 11/1987 | Yoshida | 358/257 |
| 4,568,973 | 2/1986 | Ishida | 358/449 |
| 4,580,171 | 4/1986 | Arimoto | 358/287 |
| 4,630,127 | 12/1986 | Fuwa | 358/285 |
| 4,635,129 | 1/1987 | Miyagi | 358/285 |
| 4,651,222 | 3/1987 | Gokita | 358/264 |
| 4,672,461 | 6/1987 | Yoshida | 358/453 |
| 4,675,741 | 6/1987 | Shinohara | 358/256 |
| 4,686,577 | 8/1987 | Arimoto | 358/488 |
| 4,708,486 | 11/1987 | Watanabe | 358/449 |
| 4,731,657 | 3/1988 | Miyagi | 358/285 |
| 4,734,785 | 3/1988 | Takei et al. | 358/451 |
| 4,737,856 | 4/1988 | Shimizu | 358/285 |
| 4,739,415 | 4/1988 | Toyono et al. | 358/451 |

FOREIGN PATENT DOCUMENTS

| | | |
|---|---|---|
| 0051227 | 5/1982 | European Pat. Off. . |
| 2462072 | 2/1981 | France . |
| 2571912 | 4/1986 | France . |
| 3431970 | 3/1985 | Netherlands . |
| 3510058 | 7/1986 | Netherlands . |
| 1166091 | 10/1969 | United Kingdom . |
| 2066610 | 7/1981 | United Kingdom . |

Primary Examiner—James J. Groody
Assistant Examiner—Kim Yen Vu
Attorney, Agent, or Firm—Milton S. Sales

[57] ABSTRACT

Apparatus is disclosed having document recognition capability for determining the size and location of an original document on a scanner platen before the document is scanned for image capture, and which effects both document recognition and image capture within a single scan cycle. A platen is optically scanned in forward and reverse intrack directions, and an electrical information signal characteristic of the optical densities scanned is created. Document recognition is responsive to the electrical information signal produced during the forward direction scan for detecting the boundaries of an original document on the platen. Image capture is responsive to the electrical information signal produced during the reverse direction scan for producing a record of the image on the original document. Magnification is provided for changing the size of the recorded image from that of the image on the original document in part by adjusting the speed of the reverse intrack scan, and is automatically adjustable in accordance with the size of the recording sheet.

5 Claims, 3 Drawing Sheets

DOCUMENT RECOGNITION WITH FORWARD DIRECTION SCAN FOR DETECTING THE BOUNDARIES OF AN ORIGINAL DOCUMENT AND REVERSE DIRECTION SCAN FOR PRODUCING RECORDED IMAGE ON THE ORIGINAL DOCUMENT

BACKGROUND OF THE INVENTION

1. Field of the Invention

This invention relates generally to electronic copiers, fascimile transmission equipment, or similar apparatus having the capability of determining the size and location of an original document on a scanner platen.

2. Description of the Prior Art

Scanning apparatus frequently includes document recognition schemes to determine the size and position of an original document on the scanner platen so as to provide for such features as image shift, magnification (reduction and/or enlargement), automatic recording sheet selection, edge erase, book copying, and so forth. However, on typical scanners, intrack scanning can be performed in only one direction, and the scanner must go through two complete scan cycles for each document; first performing document recognition and then image capture. Each complete scan cycle requires the scanner to move across the platen first in a forward direction and then in a reverse direction to return to its "home" position. Thus, for two complete scan cycles, the time required to produce the first copy is doubled, and the throughput rate of the scanner is reduced.

There are some scanners which overcome the throughput rate problem by performing the document recognition and image capture functions simultaneously in a single pass of the scanner over the document. For example, see U.S. Pat. No. 4,554,592, which issued on Nov. 19, 1987 to T. Yoshida. While this greatly increases the scanner's throughput rate, it eliminates any possibility of automatic magnification to fit the image to a predetermined image area if the magnification is effected by adjusting either the rate that the image is scanned or the rate at which data is stored into a buffer memory. That is, intrack magnification done to fit the image onto a recording sheet of known size by adjusting the speed of the scanner drive requires the knowledge of the size of the original document before the document is scanned in order to compute the speed of the scan (intrack magnification) and the frequency that will be used for writing data to the buffer (crosstrack magnification). Effecting document recognition and image capture during the same pass of the scanner over the document does not provide the advance knowledge of the document size required for automatic magnification.

SUMMARY OF THE INVENTION

It is an object of the present invention to provide apparatus having document recognition capability for determining the size and location of an original document on a scanner platen before the document is scanned for image capture, and which effects both document recognition and image capture within a single scan cycle.

In accordance with the present invention, scanning apparatus is provided with means for optically scanning a platen in forward and reverse intrack directions, and for creating an electrical information signal characteristic of the optical densities scanned. Document recognition means responsive to the electrical information signal produced during the forward direction scan detects the boundaries of an original document on the platen. Image capture means responsive to the electrical information signal produced during the reverse direction scan produces a record of the image on the original document.

In a preferred embodiment of the present invention, magnification means are provided for changing the size of the recorded image from that of the image on the original document. The magnification means includes means to adjust the speed of the reverse intrack scan, and is automatically adjustable in accordance with the size of the recording sheet.

Yet another advantage of the present invention is derived from performing document recognition and image capture sequentially during different portions of the scan cycle. If the document boundaries are detected simultaneously with image capture, throughput would be slowed by the amount of computation and direct memory access required to transfer the image to the printer. By first performing document recognition, document boundaries are estimated so that only the document portion of the platen is stored. All pixels go to the the proper memory locations so that they can be transferred to the printer in a single direct memory access operation.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENT

Figure 1:
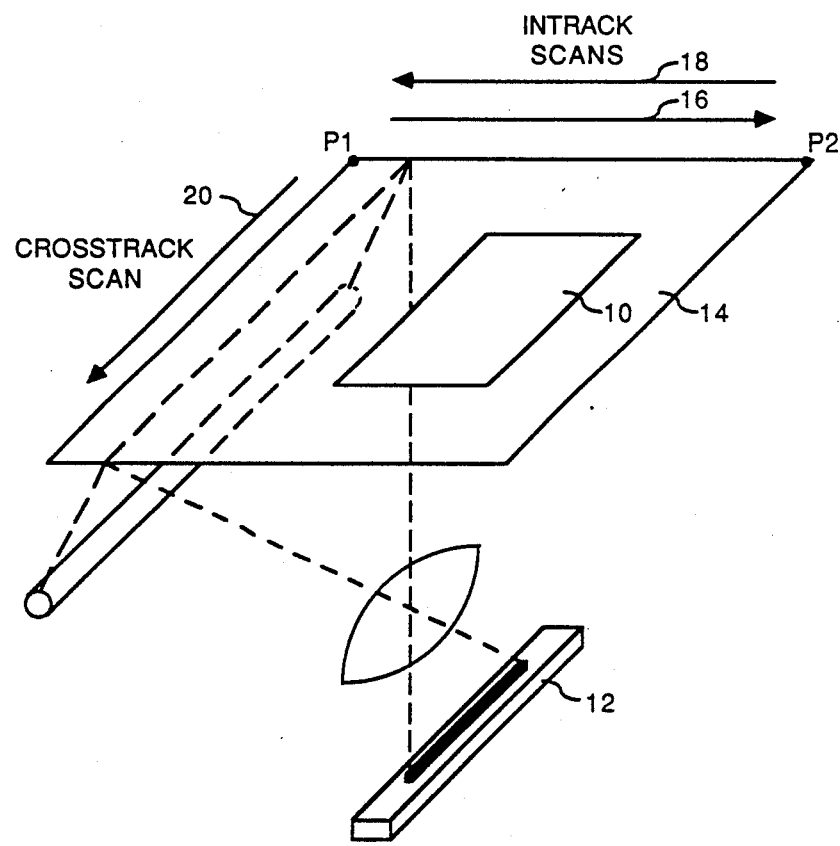
FIG. 1 is a schematic view showing a conventional document scanning process.

As shown in FIG. 1, an original document 10 is scanned with a solid-state device such as a linear array 12 of charge-coupled devices (CCD's). Light reflected from a line across a platen 14 is focused on the array, charging the CCD's until they reach a charge determined by a time constant and the intensity of the light. Once charged, the information is sequentially shifted out of the CCD's as an analog voltage.

The line of light is moved in intrack, forward and reverse directions 16 and 18, respectively, while the outputs of the CCD's are gathering information in a crosstrack direction 20. Crosstrack scanning is performed many times during the intrack movement of the line of light to fully cover platen 14, including the portion containing original document 10.

Figure 2:
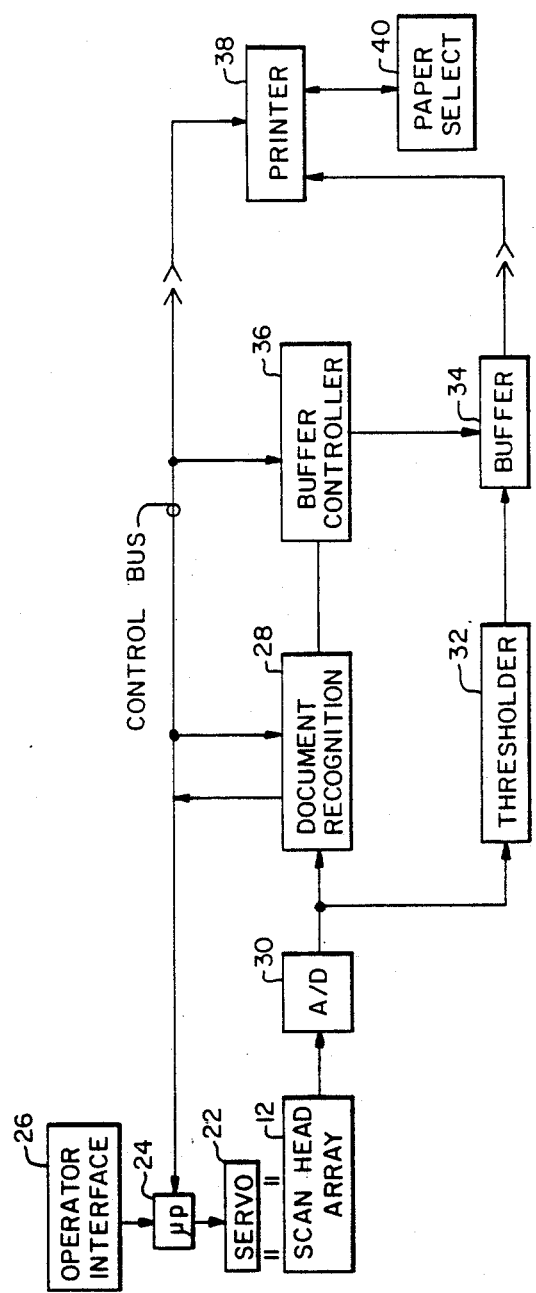
FIG. 2 is a functional block diagram of a scanner and printer according to the present invention.

Referring to FIG. 2, the scanner includes a servo drive 22 for moving the optical path to array 12 to scan the platen in the intrack direction at a scan speed determined by a microprocessor 24.

By means of operator interface 26, the microprocessor receives instructions concerning magnification and selection of paper sizes. If either automatic magnification to fit an original document to a certain recording sheet size, or automatic paper selection to fit the original document size is selected, the microprocessor activates a document recognition means 28. If used, data for document recognition is gathered by array 12 during forward scan 16 (FIG. 1), and image data is captured during reverse scan 18. If the document recognition made is not used, the image data is captured during forward scan 16.

The analog voltage signal from array 12 is converted to a multi-bit digital signal by an analog-to-digital converter 30. The digital signal is converted to a single-bit per pixel signal by image processing and bi-level processing algorithms, which change the resolution by converting the digitized video signal to a single bit "high" or "low" signal representative of "white" or "black" pixels. In the illustrated embodiment, conversion is done by a thresholder 32, but other bilevel processing algorithms can be used as well. Suitable image processing techniques wherein an image is partitioned into a finite number of disjoint (non-overlapping) pixels, each of which is represented as a pure binary quantity, i.e., object or background, are well known in the art. Of course, the conversion algorithm may convert to other than single bit for suitable printers.

The image processed signal is stored into, and withdrawn from, a buffer 34 as directed by a buffer controller 36. Data from buffer 34 is sent to a printer 38 having a paper select 40.

Document recognition block 28 identifies the boundaries of document 10 by detecting contrast between the white area of the document and the dark area surrounding the document. This operation is effected in hardware, software routines selectable from several well known in the art, or a combination thereof. In a preferred embodiment of the present invention, the leading edge of the document is detected when the video data first moves above the threshold value for a predetermined number of adjacent pixels. Once the leading edge is sensed, the system stores the intrack and crosstrack coordinates and looks for the trailing edge by requiring that the video data go, and stay, below the threshold value. The positions of the first and last detected white pixels in the intrack and crosstrack directions are used by microprocessor 24 for determining the size and position of the original document on the platen.

During the image capture scan in the non-document recognition mode, the image is captured during forward scan 16 (FIG. 1). During the image capture scan in the document recognition mode, the image is captured during the reverse scan 18. Buffer controller 36 regulates storage and retrieval for the non-document recognition mode in first-in-first-out (FIFO) order, while storage and retrieval for the document recognition mode is first-in-last-out (FILO). This keeps the order of scan lines in proper sequence during printing.

Figure 3:
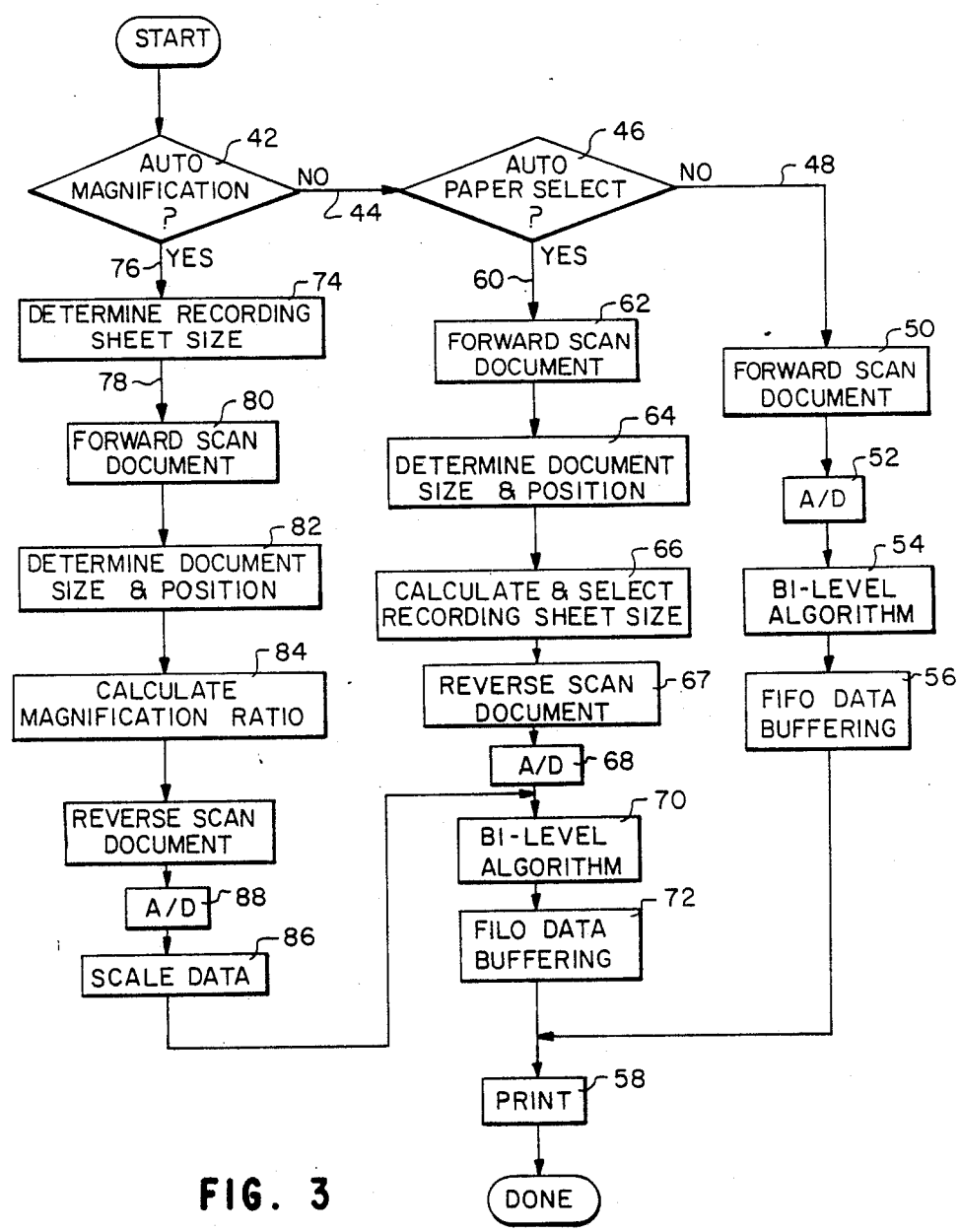
FIG. 3 is a logic flow chart of the document scanner and printer shown in FIG. 2.

FIG. 3 is a flowchart showing process steps to be followed by the system according to a preferred embodiment of the present invention. Microprocessor 24 is preferably implemented to perform the functions shown in the flowchart, although a programmable logic array or discrete logic could be used instead of the microprocessor.

Referring to FIG. 3, the process enters a decisional block 42 to determine if the operator desires to use the automatic magnification mode to fit the image of the original document to the size recording sheet available. Assuming for the moment that the decision is "no", the logic exits the decisional block along a path 44 and enters a second decisional block 46 to determine if the operator desires to use the automatic paper select mode to fit the size recording sheet to the size image of the original document.

Assuming for the moment that the decision on automatic paper select is also "no," the logic exits the decisional block along a path 48 to a functional block 50 such that servo 22 causes the array 12 to scan the platen in forward direction 18 for image capture. The image data is converted to digital form at a block 52 and is processed at a block 54. In a functional block 56, the image data is stored into and retrieved from buffer in FIFO order for printing at functional block 58.

If the decision from decisional block 46 had been "yes" instead of "no" (the operator wanted automatic selection of the proper size recording sheet), the logic would have exited block 46 along a path 60 to a functional block 62 such that servo 22 causes the array 12 to scan the platen in forward direction 18 for document recognition to determine the boundaries of the document on the platen (functional block 64). The boundary locations are fed back to the microprocessor, which queries the printer for the sizes of recording sheets available and selects that recording sheet size best suited for the original document (functional block 66). If the operator selects a magnification ratio other than one-to-one, that information is used by the microprocessor in the recording sheet selection process, and the platen is scanned in the reverse direction (block 67). The image data is converted to digital form at a block 68 and is processed at a block 70. In a functional block 72, the image data is stored into and retrieved from buffer in FILO order for printing at functional block 58.

If the decision from decisional block 42 had been "yes" instead of "no" (the operator wanted automatic magnification of the original document to properly match the recording sheet size as selected at a functional block 74), the logic would have exited block 42 along a path 76, and exited functional block 74 along a path 78 to a functional block 80 such that servo 22 causes the array 12 to scan the platen in forward direction 18 for document recognition to determine the boundaries of the document on the platen (functional block 82). The boundary locations are fed back to the microprocessor, which calculates the magnification ratio required to best fit the selected recording sheet size (functional block 84). The magnification is used by the microprocessor to determine the speed of scan during the image capture process and the rate of data storage and retrieval by buffer 34 to effect the magnification; schematically illustrated by functional block 86. The image data is converted to digital form at block 88 and is processed at block 70. In functional block 72, the image data is stored into and retrieved from buffer in FILO order for printing at functional block 58.

The invention has been described in detail with particular reference to preferred embodiments thereof, but it will be understood that variations and modifications can be effected within the spirit and scope of the invention.

What is claimed is:

1. Scanning apparatus comprising:
   means for optically scanning a platen in forward and reverse intrack directions, and for creating an electrical information signal characteristic of the optical densities scanned;
   document recognition means responsive to the electrical information signal produced during the forward direction scan for detecting the boundaries or an original document on the platen; and image capture means responsive to the electrical information signal produced during the reverse direction scan for producing a record of the image on the original document.

2. Document reproduction apparatus comprising:

means for optically scanning a platen in forward and reverse intrack directions, and for creating an electrical information signal characteristic of the optical densities scanned;

document recognition means responsive to the electrical information signal produced during the forward direction scan for detecting the boundaries of an original document on the platen; and image capture means responsive to the electrical information signal produced during the reverse direction scan for producing a record of the image on the original document;

means for recording the captured image onto a recording sheet; and magnification means for changing the size of the recorded image from that of the image on the original document.

3. Document reproduction apparatus as set forth in claim 2 wherein said magnification means includes means to adjust the speed of the reverse intrack scan.

4. Document reproduction apparatus as set forth in claim 2 further comprising means for automatically adjusting the size of the recorded image in accordance with the size of the recording sheet.

5. Document reproduction apparatus as set forth in claim 2 further comprising means for automatically selecting a recording sheet sized in accordance with the size of the original document.

* * * * *